United States Patent
Sawczuk et al.

(10) Patent No.: US 9,842,349 B2
(45) Date of Patent: Dec. 12, 2017

(54) SYSTEM AND METHOD FOR PREFERENCE DETERMINATION

(71) Applicant: LOUDDOOR, LLC, Columbia, SC (US)

(72) Inventors: James Sawczuk, Columbia, SC (US); Jeffery French, Columbia, SC (US)

(73) Assignee: LOUDDOOR, LLC, Columbia, SC (US)

( * ) Notice: Subject to any disclaimer, the term of this patent is extended or adjusted under 35 U.S.C. 154(b) by 731 days.

(21) Appl. No.: 14/328,960

(22) Filed: Jul. 11, 2014

(65) Prior Publication Data

US 2016/0012479 A1    Jan. 14, 2016

(51) Int. Cl.
*G06Q 30/02*    (2012.01)
*G06Q 50/00*    (2012.01)

(52) U.S. Cl.
CPC ......... *G06Q 30/0255* (2013.01); *G06Q 50/01* (2013.01)

(58) Field of Classification Search
None
See application file for complete search history.

(56) References Cited

U.S. PATENT DOCUMENTS

| 2008/0090513 | A1* | 4/2008 | Collins | G06Q 30/0251 455/3.01 |
| 2012/0259919 | A1* | 10/2012 | Yan | G06Q 30/02 709/204 |
| 2012/0271884 | A1* | 10/2012 | Holmes | G06Q 30/02 709/204 |

* cited by examiner

*Primary Examiner* — James Trujillo
*Assistant Examiner* — Cheryl M Shechtman
(74) *Attorney, Agent, or Firm* — Tutunjian & Bitetto, P.C.

(57) ABSTRACT

A system and method for preference determination, including obtaining permission for profile access from social media users where the users agree to participate in surveys. Profile data, preferences, and data from completed surveys is retrieved, and base odds are calculated for particular variables in profiles of respondents and of people in the general population, and attributes for which predictive targeted sets are desired are returned. The profile data, preferences, and survey data is analyzed using a combined index calculation method to reduce the profile data, preferences, and data from surveys to a single index value for one or more particular keywords. The variables are placed in rank order based on the single index value to determine a likelihood of a particular user to prefer a particular item, and a predictive targeted set is returned for a likelihood of users in a particular set of users to prefer a particular item.

17 Claims, 4 Drawing Sheets

SYSTEM AND METHOD FOR PREFERENCE DETERMINATION

BACKGROUND

Technical Field

The present invention relates to preference determination, and more particularly to determining user preferences by matching research and polling answers, with social profile data.

Description of the Related Art

In recent years, social media (e.g., Facebook®, Twitter®, etc), and the related abundance of real-time data has transformed the fields of traditional media, research, and marketing. Traditional media outlets (e.g., television, radio, print, direct mail, etc.) are now facing the challenge of digital media channels transforming how businesses reach consumers with products, services, and brand messaging that transform the way customers are acquired.

A new paradigm for marketers and researchers has been created by social media platforms because of the storing of data in a non-anonymous, structured format. For example, Facebook® members use their real identities and generally report accurate information because they are using the platform as a primary communications tool to share information with friends, family, and colleagues. Additionally, users self-identify affinities on Facebook® (and other social media platforms) for products, services, and other variables by "Liking", "Following", "Sharing", or by taking other actions depending on the social media platform being used.

There exist several challenges for marketers and researches in attempting to leverage social media data for preference determination purposes. For example, challenges include accessing the social media data in a permission based manner and structuring related data in a way that enables it to be predictive as to desired behaviors or outcomes. The first problem stems from the fact, that most relevant social media data is owned by the consumer and is generally inaccessible to marketers who deploy traditional market research methods. Secondly, even if permission is granted to use the personal social media data, there is currently no system or method which compares this data against other control groups to identify whether data points observed or provided by an individual are predictive of likely actions, affinities, or other desired outcomes.

SUMMARY

A method for preference determination, including obtaining permission for social media profile access from social media users, wherein the social media users agree to participate in one or more surveys; retrieving, and storing in a non-transitory computer readable storage medium, profile data, preferences, and data from completed surveys of one or more survey participants; calculating base odds for one or more particular variables in profiles of qualified respondents and in profiles of a general population, and stipulating attributes for which to return one or more predictive targeted sets; analyzing, using a processor, the profile data, preferences, and data from completed surveys using a combined index calculation (CIC) method to reduce the profile data, preferences, and data from completed surveys to a single index value for one or more particular keywords; placing the one or more particular variables in rank order based on the single index value generated using the CIC method to determine a likelihood of a particular user to prefer a particular item; and returning a predictive targeted set for a likelihood of one or more users in a particular set of users to prefer the particular item.

A system for preference determination, including a survey deployment module configured to obtain permission for social media profile access from social media users, wherein the social media users agree to participate in one or more surveys; a profile data retrieving module configured to retrieve, and to store in a non-transitory computer readable storage medium, profile data, preferences, and data from completed surveys of one or more survey participants; a base odds calculation module configured to calculate base odds for one or more particular variables in profiles of qualified respondents and in profiles of a general population, and stipulating attributes for which to return one or more predictive targeted sets; an analysis module configured to analyze, using a processor, the profile data, preferences, and data from completed surveys using a combined index calculation (CIC) method to reduce the profile data, preferences, and data from completed surveys to a single index value for one or more particular keywords; a ranking module configured to place the one or more particular variables in rank order based on the single index value generated using the CIC method to determine a likelihood of a particular user to prefer a particular item; and an output module configured to return a predictive targeted set for a likelihood of one or more users in a particular set of users to prefer the particular item.

A non-transitory computer readable storage medium including contents that are configured to cause a computer to perform a method for preference determination, the method including obtaining permission for social media profile access from social media users, wherein the social media users agree to participate in one or more surveys; retrieving, and storing profile data, preferences, and data from completed surveys of one or more survey participants; calculating base odds for one or more particular variables in profiles of qualified respondents and in profiles of a general population, and stipulating attributes for which to return one or more predictive targeted sets; analyzing, using a processor, the profile data, preferences, and data from completed surveys using a combined index calculation (CIC) method to reduce the profile data, preferences, and data from completed surveys to a single index, value for one or more particular keywords; placing the one or more particular variables in rank order based on the single index value generated using the CIC method to determine a likelihood of a particular user to prefer a particular item; and returning a predictive targeted set for a likelihood of one or more users in a particular set of users to prefer the particular item.

These and other features and advantages will become apparent from the following detailed description of illustrative embodiments thereof which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
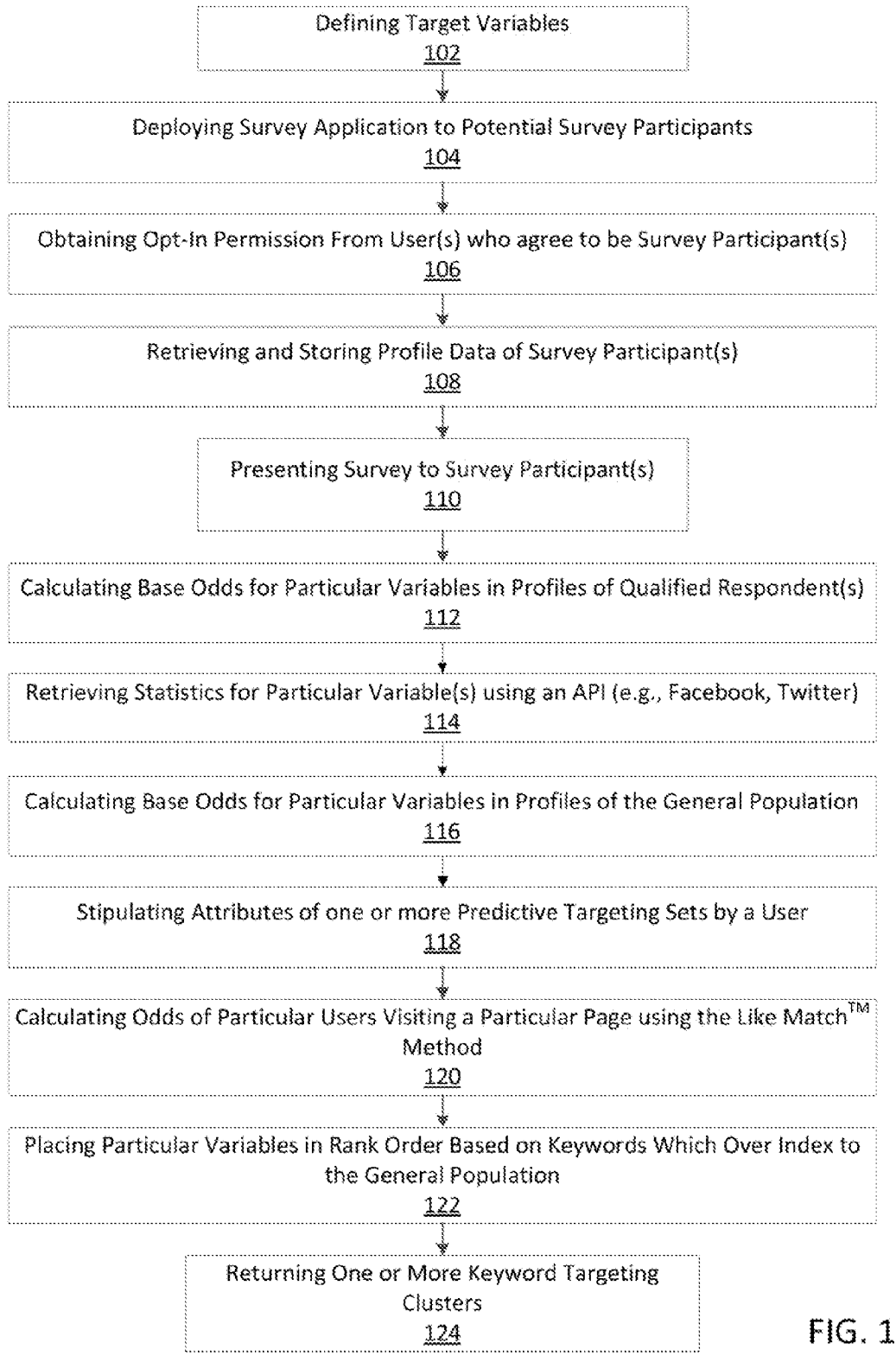
FIG. 1 is a block/flow diagram showing a system and method for preference determination by matching of research and polling answers with social profile data in accordance with an illustrative embodiment.

In accordance with the present principles, systems and methods are provided for preference determination by matching research and polling answers with social profile data, and comparing keywords and/or other data points of respondents and non-respondents to identify attributes that are highly correlative with desired responses and/or which over-index relative to non-respondents.

In one embodiment, social profile data may be obtained from users (e.g., Facebook® users, Twitter® users, etc.) using, for example, permission-based social media systems and/or processes (e.g., Facebook®), or publically available social media systems and/or processes (e.g., Twitter®). The system and method may employ a targeted marketing method which matches research and polling answers with social profile data according to the present principles to identify markers which are predictive of a plurality of attributes of the users.

It is noted that simply observing raw data from social media profiles is not sufficient to be predictive of a particular end user's preferences for targeted marketing. Indeed, simply observing raw data obtained from a social graph (e.g., Facebook®) is not sufficient to discern whether an action is predictive because that single variable does not take into account the potential ubiquity of the observed variable. For example, by identifying that a large subsection of consumers or Facebook® fans "like" a particular television program (e.g., Family Guy®) on Facebook®, does not solve the problem of whether that variable is predictive of whether other individuals who "like" that television program are likely to be valuable to marketers because the Facebook® page in the above example is "liked" by such a large number of people that it is very likely that a majority of people in any random sample would have "liked" that particular page. In fact, by targeting the Facebook® fans of a particular television program (e.g., The Family Guy) in an advertising campaign based solely on Facebook® "likes", the odds of reaching a particular target demographic could even be less than if the advertising had been selected completely randomly.

As such, there exists a need for a system and method for a systematic and scalable permission based application that enables users to access opt-in data on behalf of clients, conduct research surveys using opt-in social media applications, and comparing the target population against the general population to identify markers in their social profiles that are truly predictive of particular attributes, as in the system, and method according to the present principles.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, embodiments of the present invention may take the form of a computer program product embodied in one or more computer readable medium(s) having computer readable program code embodied thereon.

Any combination of one or more computer readable medium(s) may be employed. The computer readable medium may be a computer readable signal medium or a computer readable storage medium. A computer readable storage medium may be, but is not limited to, an electronic, magnetic, optical, electromagnetic, infrared, or semiconductor system, apparatus, or device, or any combination thereof. Other examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. In this document, a computer readable storage medium may be any tangible medium that can contain, or store a program for use by or in connection with a computing system, apparatus, or device.

Program code embodied on a computer readable medium may be transmitted using any suitable medium, including but not limited to wireless, wireline, optical fiber cable, etc., or any combination thereof. Computer program code for carrying out operations for aspects of the present invention may be written in any combination of one or more programming languages, including, but not limited to any general-purpose programming language (e.g., PHP, Java, C++, etc.) and/or domain-specific programming language (e.g. HTML, SQL, etc.). The program code may execute fully on the user's computer/mobile device, partially on the user's computer/mobile device, as stand-alone software, partially on the user's computer/mobile device and partially on a remote computer/mobile device, or entirely on a remote computer or server. The remote computer may be connected to the user's computer through any type of network (e.g., a local area network (LAN), wide area network (WAN), a connection to an external computer (e.g., over the Internet using an Internet Service Provider), etc.).

Aspects of the present invention are described below with reference to flowchart illustrations and/or block diagrams of methods, systems and computer program products according to embodiments of the present invention. It is noted, that each block of the flowcharts and/or block, diagrams, and combinations of blocks in the flowcharts and/or block diagrams, may be implemented by computer program instructions.

These computer program instructions may be sent to a processor of any type of computing system (e.g., general purpose computer, special purpose computer, or other programmable data processing apparatus to produce a machine), such that the instructions, which execute by the processor of the computing system, create a means for implementing the functions/instructions/acts specified, in the flowcharts and/or block diagram block or blocks. These computer program instructions may also be stored in a computer readable medium that can instruct any computing device to function in a particular manner, such that the instructions stored in the computer readable medium produce an article of manufacture including instructions which implement the function/instruction/act specified in the flowchart and/or block diagram block or blocks.

The computer program instructions may also be loaded onto a computer, mobile device, other programmable data processing apparatus, or other devices to cause a series of operational steps to be performed on any computing system to produce a computer implemented process such that the instructions which execute on the computer or other programmable apparatus provide processes for implementing the functions/acts specified in the flowcharts and/or block diagram block or blocks.

A computer readable signal medium may include a propagated data signal with computer readable program code embodied therein (e.g., baseband, part of a carrier wave, etc.). Such a propagated signal may take any of a variety of forms, including, but not limited to, electro-magnetic, optical, or any combination thereof. A computer readable signal medium may be any computer readable medium that is not a computer readable storage medium and that can communicate, propagate, or transport a program for use by or in connection with a computing system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, a system and method for preference determination by matching of research and polling answers with social profile data is illustratively depicted in accordance with one embodiment according to the present principles.

In one embodiment target variables may be determined and/or selected in block 102. Target variables may be individual attributes of a particular user/survey participant for which end user (e.g., marketer, researcher, etc.) is interested, and may be structured as survey-type questions. For example, a target variable may be determined by presenting to a particular user/survey participant the following question: "What is your annual household income?", or by presenting a participant with images of several packages, and then asking "Which package do you prefer?". Once target variables are defined, a survey application may be deployed via, for example, a social media platform (e.g., Facebook®, Twitter®, etc.), and may request that a particular user/survey participant take part in the survey in block 104.

Opt-in permission from particular users who agree to be survey participants may be obtained in block 106. For example, individuals who respond to a survey participation request may be required to install an application which requests that the individual grant the application access to their personal data in their social media profile (e.g., public profile, friend list, address, birthday, interests, current city, personal description, likes, etc.). Once opt-in permission has been, granted by an individual in block 106, that individual has agreed to become a survey participant. The system according to the present principles may retrieve and store profile data (e.g., Facebook® profile data, Twitter® profile data, etc.) of survey participants in block 108, and may present the survey to one or more survey participants in block 110, and the survey participants may respond to one or more survey questions.

In one embodiment, the target variable odds may be calculated for one or more data variables (e.g., social media variables) in user profiles (e.g., Facebook® profile, Twitter® profile, etc.) of qualified respondents in block 112. It is noted that qualified respondents are defined as respondents in a statistically reliable sample who possess the target variable desired by the end user (e.g., user who responded that their household income exceeds $100,000, etc.). The target variable odds may be calculated by calculating the number of qualified respondents attached to a particular data variable (e.g., follow a brand on Twitter, like a page on Facebook) divided by the total number of respondents in a sample set (e.g., total number of people to which a particular survey was presented). Statistics for each of one or more data variables (e.g., social media variables) may be retrieved by an Application Programming Interface (API) (e.g., Facebook® API, Twitter® API, etc.) according to the present principles in block 114. It is noted that it is also contemplated, that the particular data variables (e.g., follow a brand on Twitter®, like a page on Facebook®, etc.) may also be retrieved automatically by the system and employed for preference determination according to the present principles.

In one embodiment, base odds may be calculated for one or more data variables (e.g., social media variables) in the general population in block 116. It is noted that the general population is defined as the total number of individual registered users of a particular social network (e.g., Facebook®, Twitter®, etc.). The base odds for a data variable being attached to any particular user in the general, population is calculated as the total number of users attached to a particular data variable on, for example, a social network (e.g., follow a brand on Twitter®, like a page on Facebook®, etc.) divided by the total number of individuals on that particular social network in block 116. It is noted that the above-mentioned odds may be calculated for a single social network, or for any of a plurality of different social networks substantially simultaneously according to the present principles.

In one embodiment, a system end user (e.g., marketer, researcher, etc.) may stipulate the desired target attributes (e.g., individuals likely to have household income greater than $100,000) for which one or more predictive targeting sets may be generated in block 118. According to the present principles and upon stipulation of the aforementioned desired target attributes, a combined index calculation (CIC) method may be employed to generate an index value and to calculate the odds that individual social media users who are attached to a particular data variable (or combination of data variables) on, for example, a social network (e.g., follow a brand on Twitter®, like a page on Facebook®, etc.) possess the desired target attributes in block 120. A computing system may employ a processor to place particular variables or combinations thereof in rank order based on keywords which most over-index to the general population or are otherwise most predictive of the desired target attributes by employing the output from the CIC method according to the present principles in block 122. A system end user may define the number, type, name, etc. of keywords or combinations thereof to be employed to determine based on, for example, the size of a focus group, the size and breadth of an advertising campaign, level of required precision in predicting a particular attribute etc., and may export the keywords (and/or specific combinations thereof) into any platform (e.g., advertising buying platform, underwriting platform, CRM system, etc.), and may return one or more keyword targeting clusters in block 124.

It is noted that although the system and method are discussed with respect to social media platforms, it is contemplated that the present principles may also be employed to determine preferences for users of any system which incorporates user profiles (e.g., employee database, gaming forums, department store websites, etc.) in accordance with the present principles. It is further noted that the present principles may be employed to predict any of a plurality of attributes and/or behaviors of a customer (e.g., survey participant), including, but not limited to, food preferences, automobile preferences, whether the customer is a smoker, home type preferences, home location preferences, etc. in accordance with one embodiment.

Figure 2:
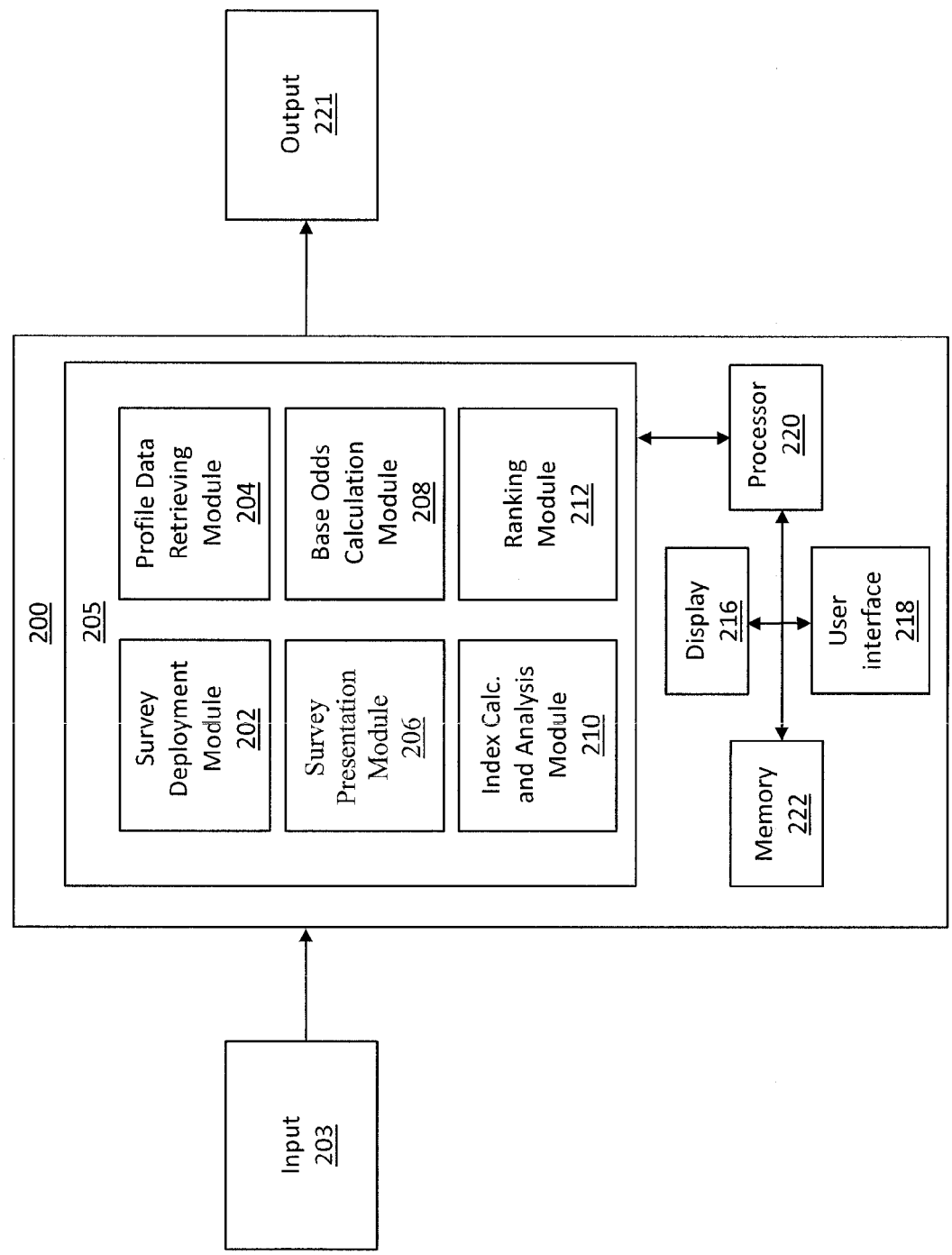
FIG. 2 is a block/flow diagram showing a system architecture for a preference determination system which matches research and polling answers with social profile data in accordance with an illustrative embodiment.

Referring now to FIG. 2, an architecture for a preference determination system which matches research and polling answers with social profile data 200 is illustratively depicted in accordance with one embodiment of the present principles. The system 200 preferably includes one or more processors 220 and memory 222 for storing applications, modules and other data. The system 200 may include one or more displays 216 for viewing. The displays 216 may permit a user to interact with the system 200 and its components and functions. This may be further facilitated by a user interface 218, which may include a mouse, joystick, or any other peripheral or control to permit user interaction with the system 200 and/or its devices. It should be understood that the components and functions of the system 200 may be integrated into one or more systems or workstations.

The system 200 may receive input data 203 (e.g., (e.g., social profile data, keyword data, etc.), which may be employed as input to a plurality of modules 205, including a survey deployment module 202, a profile data retrieving module 204, a survey presentation module 206, a base odds calculation module 208, an index calculation and analysis module 210, and a ranking module 212. The system 200 may produce output data 221, which in one embodiment may be displayed on one or more display devices 216. It should be noted that while the above configuration is illustratively depicted, it is contemplated that other sorts of configurations may also be employed according to the present principles.

In one embodiment, the index calculation and analysis module 210 may employ the CIC method according to the present principles coupled with a processor to determine the likelihood of a user being in a targeted set based upon the frequency of users who possess the target variable desired (based upon responses to aforementioned survey or other research application) who 'like' a page (e.g., Facebook® page) versus the likelihood of a general user to 'like' the same page. These likelihoods may be expressed as indices, and the results may be expressed, for example, by the system returning that a user in a targeted set (e.g., user whose household income is >$100,000) is Y times more likely to 'like' page X than the average Facebook® user, or that the results of employing the CIC method according to the present principles enable a system end user to determine, for example, that Y times as many Facebook® users 'like' page X as would be expected based solely on Facebook® averages.

The CIC method according to the present principles may be employed to determine an index value for any desired object/page/product/etc. (e.g., Facebook® page, Twitter® user, particular product, particular brand, etc.) using the index calculation and analysis module 210. In one embodiment, a social graph G, with vertices V and edges E, where vertices may be any variable (e.g., Facebook® fan pages. Twitter® users, etc.) and edges may be links or connections between two vertices (e.g., John Doe "follows" Coca Cola® on Twitter®).

In an illustrative embodiment, the CIC method according to the present principles may be employed to determine an index value by calculating the following:

$$\text{Index}(B) = \frac{\text{Connections }(C, B)}{\left(\frac{\text{Connections }(U, B)}{\sum U}\right) \times \sum C},$$

where U is a population of user vertices ($U \subseteq V$) that may connect to the aforementioned vertices (V), C is a subset of the user vertices ($C \subseteq U \subseteq V$) that are of interest in a particular trial, Connections (C, B) is a function which may return the number of connections between users in the set C and a brand of interest B and may represent the connections of particular survey respondents who possess the desired attribute or attributes, and Connections (U, B) is a function which may return the number of connections between users in the set U and a brand of interest B. It is noted that on most social networks, users may connect to each other as well, but for simplicity those connections are not explicitly illustrated above. It is further noted that other methods may be employed to further improve the accuracy of the CIC method by including sample corrections and variables for known bias.

In another embodiment, the CIC method according to the present principles may be employed to determine the tendency of a user in a targeted set to 'like' a page on a social networking site which includes a personal profile, friends, status updates, various pages, etc. (e.g., Facebook®, Google®+, etc.) versus the tendency of a normal user to like that same page. For example, the CIC method according to the present principles may be employed to determine an index value of a particular Facebook® page P by calculating the following:

$$\text{Index}(P) = \frac{Set_{Fans(P)}}{\left(\frac{Facebook^{\circledR}_{Fans(P)}}{Facebook^{\circledR}_{Users}}\right) \times Set_{Users}},$$

Where $Set_{Fans}$ is the number of fans of a particular Facebook® page P in a targeted set, Facebook®$_{Fans(P)}$ is the number of fans of a particular Facebook® page P on all of Facebook®, Facebook®$_{Users}$ is the total number of active Facebook® users, and $Set_{Users}$ is the number of users in the targeted set. The CIC method according to the present principles may also employ the total number of inactive Facebook® users, or a combination of the total number of active and inactive Facebook® users in some embodiments. The above CIC method may be run for each Facebook® page in a targeting set that is liked by two or more users, and the results may be sorted in order of the determined index, values (ascending or descending order), and may be stored in a computer readable storage medium.

It is noted that the CIC method according to the present principles may be applied to any social media platform. For example, the present principles may also be applied to Twitter and Spotify, among any sort of other social platforms. In one embodiment, the CIC method according to the present principles may be employed to determine an index value for a particular Twitter® user or brand T by calculating the following:

$$Index(T) = \frac{Set_{Followers(T)}}{\left(\frac{Twitter®_{Followers(T)}}{Twitter®_{Users}}\right) \times Set_{Users}},$$

where $Set_{Followers}$ is the number of followers of a particular Twitter® user or brand T in a targeted set, Twitter®$_{Followers(P)}$ is the number of followers of a particular Twitter® user or brand T on all of Twitter®, Twitter®$_{Users}$ is the total number of active Twitter® users, and $Set_{Users}$ is the number of users in the targeted set. The CIC method according to the present principles may also employ the total number of inactive Twitter® users, or a combination of the total number of active and inactive Twitter® users in some embodiments. The above CIC method may be run for each Twitter® page in a targeting set that is followed by two or more users, and the results may be sorted in order of the determined index, values (ascending or descending order), and may be stored in a computer readable storage medium.

In one embodiment, the CIC method according to the present principles may be employed to determine an index value for a particular Spotify® user or brand S by calculating the following:

$$Index(S) = \frac{Set_{Followers(S)}}{\left(\frac{Spotify®_{Followers(S)}}{Spotify®_{Users}}\right) \times Set_{Users}},$$

where $Set_{Followers}$ is the number of followers of a particular Spotify® user or brand (S) in a targeted set, Spotify®$_{Followers(P)}$ is the number of followers of a particular Spotify® user or brand (S) in a targeted set on all of Spotify®, Spotify®$_{Users}$ is the total number of active Spotify® users, and $Set_{Users}$ is the number of users in the targeted set. The CIC method according to the present principles may also employ the total number of inactive Spotify® users, or a combination of the total number of active and inactive Spotify® users in some embodiments. The above CIC method may be run for each Spotify® page in a targeting set that is followed by two or more users, and the results may be sorted in order of the determined index values (ascending or descending order), and may be stored in a computer readable storage medium.

It is noted that a weighting coefficient may be employed in the CIC method according to the present principles. The process of weighting may involve emphasizing the contribution of some aspects of a phenomenon (or of a set of data) to a final effect or result, giving those aspects more weight, in the analysis. That is, rather than each variable in the data contributing equally to the final result, some data may be adjusted to contribute more than others. It is further noted that any permutation of the above CIC methods may be employed according to the present principles, and which (if any) permutations may be employed is dependent on the desired results, availability of data, etc.

In one embodiment, the ranking module 212 may sort particular variables (e.g., social media variables), which may be selected by an end user, into rank order based on keywords which over-index to the general population, and one or more keyword targeting clusters may be returned as output in block 221. It is noted that keywords which do not over-index to the general population may also be selected to be returned according to the present principles.

It is further noted that while Facebook, Twitter, and Spotify platforms have been discussed as illustrative embodiments for which the CIC method may be applied, it is contemplated that the CIC method may also be employed in any other social media platforms and any other platforms which employ user profiles and/or following/liking/etc. of pages, users, brands, etc. according to the present principles.

Figure 3:
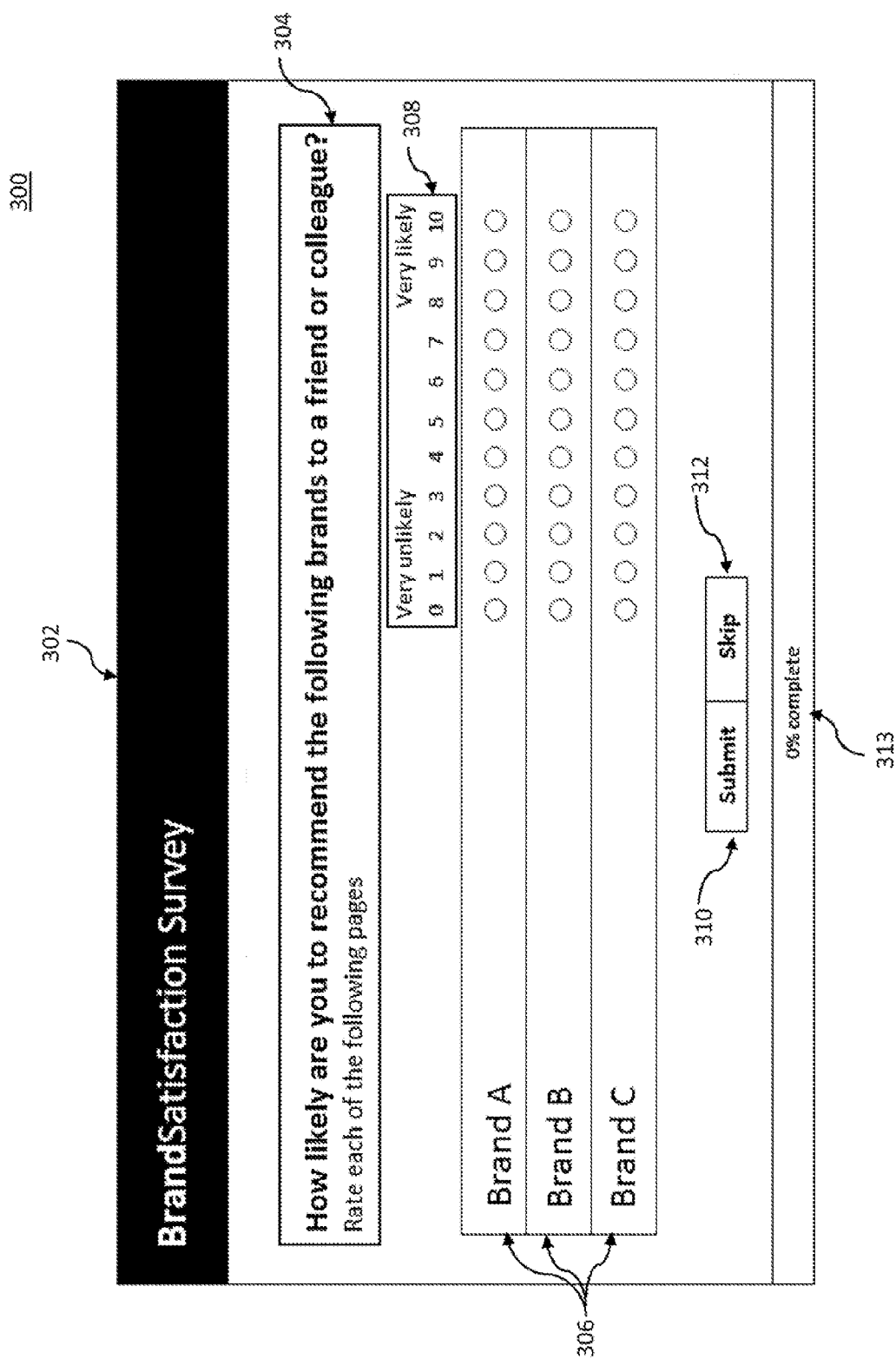
FIG. 3 is a diagram showing a graphical user interface (GUI) for conducting a survey in accordance with an illustrative embodiment.

Referring now to FIG. 3, a diagram showing a graphical user interface (GUI) for conducting a survey 300 is illustratively depicted in accordance with one embodiment. The title of the survey may be displayed in a title bar 302, and a survey question may be presented in block 304. A survey participant may answer any questions presented using check boxes in block 306 (e.g., which brand does a survey participant prefer?, how likely is a person to recommend a brand to a friend?, etc.).

Customers (e.g., survey participants) may check a box which indicates their level of satisfaction with a particular brand based on, for example, a likelihood of recommending a brand to a friend or colleague in block 308, wherein the survey participants level of satisfaction (e.g., likelihood of recommending a brand) is an example of a target variable. Survey participants may skip one or more questions in a survey using the button on the display 312, and may submit an answer to a question using the button on the display 310. A progress bar may be displayed to inform a survey participant of how much of the survey has been completed in block 313.

It is noted that although the above diagram of a GUI for conducting a survey is illustratively depicted, it is contemplated that any sort of GUI for presenting a survey may also be employed according to the present principles.

Figure 4:
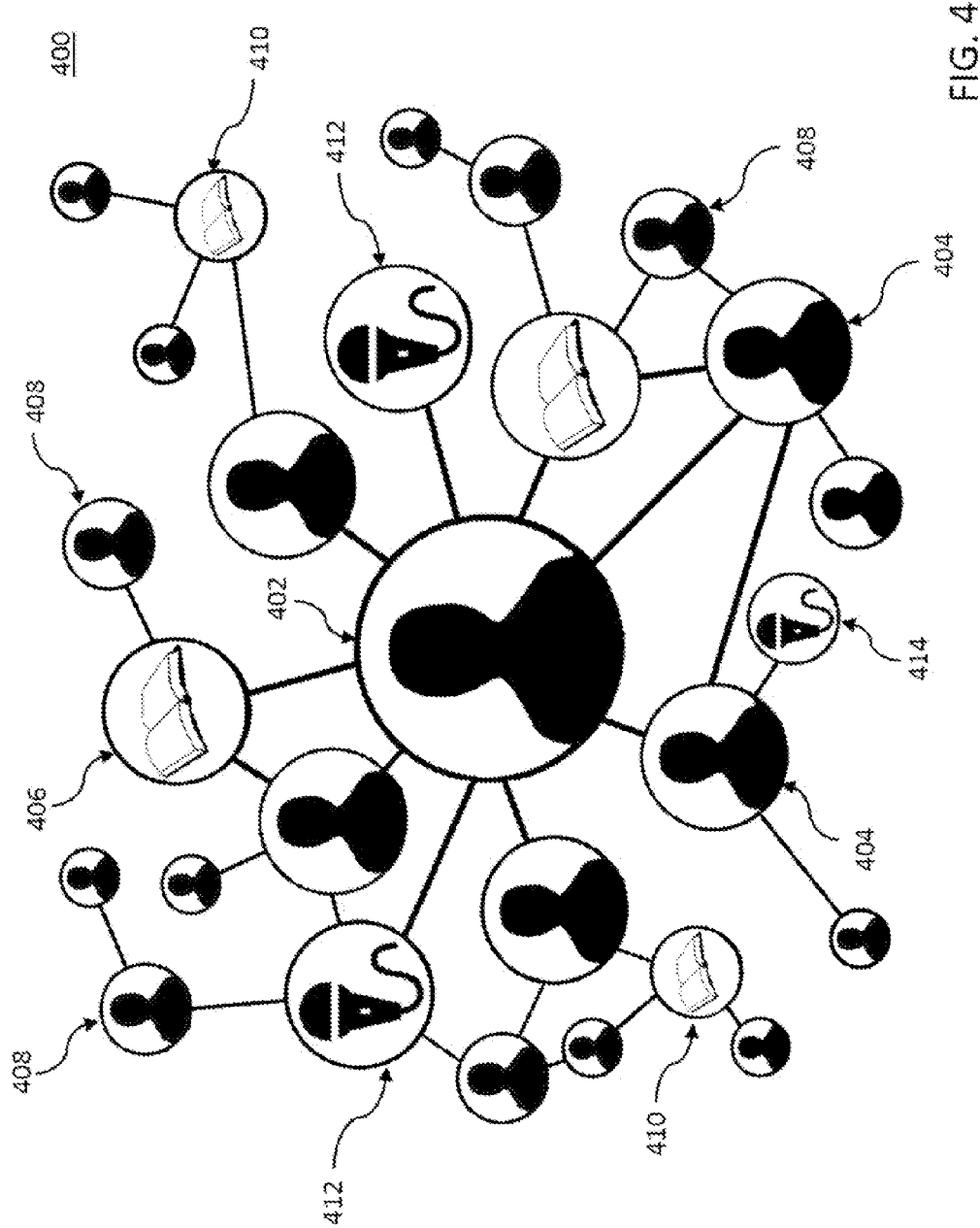
FIG. 4 is a diagram showing a high level social network graph in accordance with an illustrative embodiment.

Referring now to FIG. 4, a high level social network graph 400 is illustratively depicted in accordance with the present principles. In one embodiment, a customer (e.g., survey participant) may be illustrated in block 402. Connections to various nodes (e.g., people, pages, events, etc.) are illustrated, and these entities may be primary connections (e.g., directly connected to the customer), secondary connections (e.g., once removed from being directly connected to the customer), tertiary connections (e.g., twice removed from being directly connected to the customer), etc. In this embodiment, primary connections with people 404, primary connections with pages liked 406, primary connections with events 412, secondary connections with people 408, secondary connections with pages liked 410, and secondary connections with events 414 are illustratively depicted to show how one customer may be connected to a plurality of people, pages, events, etc. using social media. This information may be employed according to the present principles to determine an individual's preferences.

It is noted that although the number and/or type of connections is limited in FIG. 4 for simplicity, any number and/or type of connections may be employed (e.g., twice removed, three times removed, etc.) according to the present principles.

Having described preferred embodiments of a system and method for reducing latency time with cloud services (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

What is claimed is:

1. A method for preference determination, comprising:
    retrieving, and storing in a non-transitory computer readable storage medium, profile data, preferences, and data from completed surveys of one or more survey participants;
    calculating base odds for one or more particular variables in profiles of the survey participants and in profiles of a general population, and stipulating attributes triggering a return of one or more predictive targeted sets;
    reducing the profile data, preferences, and data from completed surveys to a single index value for one or more particular keywords using a combined index calculation (CIC) method, the single index value being determined by:

$$\text{Index}(B) = \frac{\text{Connections}(C, B)}{\left(\frac{\text{Connections}(U, B)}{\sum U}\right) \times \sum C},$$

where U is a set of user vertices in a social media graph, C is a subset of the user vertices that are of interest in a particular instance, Connections (C, B) is a number of connections between users in the subset C and a brand of interest B in a targeted set, and Connections (U, B) is a number of connections between users in the set U and the brand of interest B in the targeted set;
    placing the one or more particular variables in rank order based on the single index value to determine a likelihood of a particular user to prefer a particular item; and
    returning a predictive targeted set for a likelihood of one or more users in a particular set of users to prefer the particular item.

2. The method as recited in claim 1, wherein the one or more particular keywords over-index to the general population.

3. The method as recited in claim 1, wherein the predictive targeted set returns a prediction of a likelihood of one or more users in a particular set of users to exhibit one or more of a plurality of behaviors.

4. The method as recited in claim 1, wherein the CIC method determines the single index value for one or more social media user (SMU) pages by:

$$\text{Index}(P) = \frac{\text{Set}_{Fans(P)}}{\left(\frac{\text{SMU}_{Fans(P)}}{\text{SMU}_{Users}}\right) \times \text{Set}_{Users}},$$

where $\text{Set}_{Fans}$ is a number of fans of a particular SMU page (P) in a targeted set, $\text{SMU}_{Fans(P)}$ is a number of fans of the SMU page (P) on all of a particular social media platform (SMP), $\text{SMU}_{Users}$ is a total number of active users of the SMP, and $\text{Set}_{Users}$ is a number of users in the targeted set.

5. The method as recited in claim 1, wherein the CIC method determines the single index value for one or more social media platform (SMP) users by:

$$\text{Index}(T) = \frac{\text{Set}_{Followers(T)}}{\left(\frac{\text{SMP}_{Followers(T)}}{\text{SMP}_{Users}}\right) \times \text{Set}_{Users}},$$

where $\text{Set}_{Followers}$ is a number of followers of a particular SMP user or brand (T) in a targeted set, $\text{SMP}_{Followers(P)}$ is a number of followers of the SMP user or brand (T) on all of the SMP, $\text{SMP}_{Users}$ is a total number of active users of the SMP, and $\text{Set}_{Users}$ is a number of users in the targeted set.

6. The method as recited in claim 1, wherein the CIC method determines the single index value for one or more digital media platform (DMP) pages by:

$$\text{Index}(S) = \frac{\text{Set}_{Followers(S)}}{\left(\frac{\text{DMP}_{Followers(S)}}{\text{DMP}_{Users}}\right) \times \text{Set}_{Users}},$$

where $\text{Set}_{Followers}$ is a number of followers of a particular DMP user or brand (S) in a targeted set, $\text{DMP}_{Followers(P)}$ is a number of followers of the DMP user or brand (S) on all of the DMP, $\text{DMP}_{Users}$ is a total number of active users of the DMP, and $\text{Set}_{Users}$ is a number of users in the targeted set.

7. A system for preference determination, comprising:
    a profile data retrieving module configured to retrieve, and to store in a non-transitory computer readable storage medium, profile data, preferences, and data from completed surveys of one or more survey participants;
    a base odds calculation module configured to calculate base odds for one or more particular variables in profiles of the survey participants and in profiles of a general population, and stipulating attributes triggering a return of one or more predictive targeted sets;
    an analysis module configured to reduce the profile data, preferences, and data from completed surveys to a single index value for one or more particular keywords using a combined index calculation (CIC) method, the single index value being determined by:

$$\text{Index}(B) = \frac{\text{Connections}(C, B)}{\left(\frac{\text{Connections}(U, B)}{\sum U}\right) \times \sum C},$$

where U is a set of user vertices in a social media graph, C is a subset of the user vertices that are of interest in a particular instance, Connections (C, B) is a number of connections between users in the subset C and a brand of interest B in a targeted set, and Connections (U, B) is a number of connections between users in the set U and the brand of interest B in the targeted set;

a ranking module configured to place the one or more particular variables in rank order based on the single index value to determine a likelihood of a particular user to prefer a particular item; and an output module configured to return a predictive targeted set for a likelihood of one or more users in a particular set of users to prefer the particular item.

8. The system as recited in claim 7, wherein the one or more particular keywords over-index to the general population.

9. The system as recited in claim 7, wherein the predictive targeted set returns a prediction of a likelihood of one or more users in a particular set of users to exhibit one or more of a plurality of behaviors.

10. The system as recited in claim 7, wherein the CIC method determines the single index value for one or more social media user (SMU) pages by:

$$Index(P) = \frac{Set_{Fans(P)}}{\left(\frac{SMU_{Fans(P)}}{SMU_{Users}}\right) \times Set_{Users}},$$

where $Set_{Fans}$ is a number of fans of a particular SMU page (P) in a targeted set, $SMU_{Fans(P)}$ is a number of fans of the SMU page (P) on all of a particular social media platform (SMP), $SMU_{Users}$ is a total number of active users of the SMP, and $Set_{Users}$ is a number of users in the targeted set.

11. The system as recited in claim 7, wherein the CIC method determines the single index value for one or more social media platform (SMP) users by:

$$Index(T) = \frac{Set_{Followers(T)}}{\left(\frac{SMP_{Followers(T)}}{SMP_{Users}}\right) \times Set_{Users}},$$

where $Set_{Followers}$ is a number of followers of a particular SMP user or brand (T) in a targeted set, $SMP_{Followers(P)}$ is a number of followers of the SMP user or brand (T) on all of the SMP, $SMP_{Users}$ is a total number of active users of the SMP, and $Set_{Users}$ is a number of users in the targeted set.

12. The system as recited in claim 7, wherein the CIC method determines the single index value for one or more digital media platform (DMP) pages by:

$$Index(S) = \frac{Set_{Followers(S)}}{\left(\frac{DMP_{Followers(S)}}{DMP_{Users}}\right) \times Set_{Users}},$$

where $Set_{Followers}$ is a number of followers of a particular DMP user or brand (S) in a targeted set, $DMP_{Followers(P)}$ is a number of followers of the DMP user or brand (S) on all of the DMP, $DMP_{Users}$ is a total number of active users of the DMP, and $Set_{Users}$ is a number of users in the targeted set.

13. A non-transitory computer readable storage medium including contents that are configured to cause a computer to perform a method for preference determination, the method comprising:

retrieving, and storing profile data, preferences, and data from completed surveys of one or more survey participants;

calculating base odds for one or more particular variables in profiles of the survey participants and in profiles of a general population, and stipulating attributes triggering a return of one or more predictive targeted sets;

reducing the profile data, preferences, and data from completed surveys to a single index value for one or more particular keywords using a combined index calculation (CIC) method, the single index value being determined by:

$$Index(B) = \frac{Connections(C, B)}{\left(\frac{Connections(U, B)}{\sum U}\right) \times \sum C},$$

where U is a set of user vertices in a social media graph, C is a subset of the user vertices that are of interest in a particular instance, Connections (C, B) is a number of connections between users in the subset C and a brand of interest B in a targeted set, and Connections (U, B) is a number of connections between users in the set U and the brand of interest B in the targeted set;

placing the one or more particular variables in rank order based on the single index value to determine a likelihood of a particular user to prefer a particular item; and returning a predictive targeted set for a likelihood of one or more users in a particular set of users to prefer the particular item.

14. The non-transitory computer readable storage medium as recited in claim 13, wherein the one or more particular keywords over-index to the general population.

15. The non-transitory computer readable storage medium as recited in claim 13, wherein the CIC method determines the single index value for one or more social media user (SMU) pages by:

$$Index(P) = \frac{Set_{Fans(P)}}{\left(\frac{SMU_{Fans(P)}}{SMU_{Users}}\right) \times Set_{Users}},$$

where $Set_{Fans}$ is a number of fans of a particular SMU page (P) in a targeted set, $SMU_{Fans(P)}$ is a number of fans of the SMU page (P) on all of a particular social media platform (SMP), $SMU_{Users}$ is a total number of active users of the SMP, and $Set_{Users}$ is a number of users in the targeted set.

16. The non-transitory computer readable storage medium as recited in claim 13, wherein the CIC method determines the single index value for one or more social media platform (SMP) users by:

$$Index(T) = \frac{Set_{Followers(T)}}{\left(\frac{SMP_{Followers(T)}}{SMP_{Users}}\right) \times Set_{Users}}$$

where $Set_{Followers}$ is a number of followers of a particular SMP user or brand (T) in a targeted set, $SMP_{Followers(P)}$ is a number of followers of the SMP user or brand (T) on all of the SMP, $SMP_{Users}$ is a total number of active users of the SMP, and $Set_{Users}$ is a number of users in the targeted set.

17. The non-transitory computer readable storage medium as recited in claim 13, wherein the CIC method determines the single index value for one or more digital media platform (DMP) pages by:

$$Index(S) = \frac{Set_{Followers(S)}}{\left(\frac{DMP_{Followers(S)}}{DMP_{Users}}\right) \times Set_{Users}},$$

where $Set_{Followers}$ is a number of followers of a particular DMP user or brand (S) in a targeted set, $DMP_{Followers(P)}$ is a number of followers of the DMP user or brand (S) on all of the DMP, $DMP_{Users}$ is a total number of active users of the DMP, and $Set_{Users}$ is a number of users in the targeted set.

* * * * *